(12) United States Patent
Johann et al.

(10) Patent No.: US 9,932,249 B2
(45) Date of Patent: Apr. 3, 2018

(54) ION EXCHANGE CARTRIDGE FOR TREATING DRINKING WATER

(71) Applicant: BWT water+more GmbH, Mondsee (AT)

(72) Inventors: Juergen Johann, Nussloch (DE); Monique Bissen, Mondsee (AT)

(73) Assignee: BWT water+more GmbH, Mondsee (AT)

( * ) Notice: Subject to any disclaimer, the term of this patent is extended or adjusted under 35 U.S.C. 154(b) by 322 days.

(21) Appl. No.: 14/388,657

(22) PCT Filed: Apr. 9, 2013

(86) PCT No.: PCT/EP2013/057398
§ 371 (c)(1),
(2) Date: Sep. 26, 2014

(87) PCT Pub. No.: WO2013/153069
PCT Pub. Date: Oct. 17, 2013

(65) Prior Publication Data
US 2015/0053618 A1 Feb. 26, 2015

(30) Foreign Application Priority Data

Apr. 12, 2012 (DE) .................. 10 2012 007 149

(51) Int. Cl.
*C02F 1/42* (2006.01)
*C02F 1/00* (2006.01)
(Continued)

(52) U.S. Cl.
CPC ................ *C02F 1/42* (2013.01); *B01J 39/05* (2017.01); *B01J 39/07* (2017.01); *B01J 47/024* (2013.01);
(Continued)

(58) Field of Classification Search
CPC ...... B01J 39/043; B01J 39/046; B01J 47/024; B01J 47/02; B01J 47/022; B01J 47/145;
(Continued)

(56) References Cited

U.S. PATENT DOCUMENTS 2,906,716 A 9/1959 Hwa
3,327,859 A 12/1963 Pall
(Continued)

FOREIGN PATENT DOCUMENTS

DE 2608408 A1 11/1976
DE 2948795 A1 6/1980
(Continued)

OTHER PUBLICATIONS

Machine language translation of JP10109088A (Matsukawa et al) obtained from the J-Plat Pat website on Dec. 28, 2016, 7 pages.*
(Continued)

*Primary Examiner* — Matthew O Savage
(74) *Attorney, Agent, or Firm* — Kaplan Breyer Schwarz, LLP

(57) ABSTRACT

A cartridge for treating drinking water, comprising two chambers, wherein one chamber is filled with a highly acidic ion-exchange material and another chamber is filled with a weakly acidic ion-exchange material, wherein one of the ion-exchange materials is loaded with alkali ions or alkaline earth ions.

2 Claims, 3 Drawing Sheets

(51) Int. Cl.
    *B01J 47/024* (2017.01)
    *B01J 39/05* (2017.01)
    *B01J 39/07* (2017.01)
    *C02F 1/68* (2006.01)
    *C02F 103/04* (2006.01)

(52) U.S. Cl.
    CPC .............. *C02F 1/003* (2013.01); *C02F 1/68* (2013.01); *C02F 2001/425* (2013.01); *C02F 2103/04* (2013.01); *C02F 2201/006* (2013.01); *C02F 2301/04* (2013.01); *C02F 2301/043* (2013.01); *C02F 2307/04* (2013.01)

(58) Field of Classification Search
    CPC . B01J 39/05; B01J 39/07; C02F 1/003; C02F 1/68; C02F 2001/425; C02F 2301/043; C02F 2301/04; C02F 1/42; C02F 2307/04; C02F 210/04; C02F 2201/0063
    See application file for complete search history.

(56) References Cited

U.S. PATENT DOCUMENTS

| | | |
|---|---|---|
| 4,198,296 A | 4/1980 | Doumas et al. |
| 4,775,585 A | 10/1988 | Hagiwara et al. |
| 5,215,657 A | 6/1993 | Goldfield et al. |
| 2003/0168395 A1 | 9/2003 | Maeno et al. |
| 2005/0056687 A1 | 3/2005 | Matsumoto et al. |
| 2006/0246285 A1 | 11/2006 | Schmidtbauer et al. |
| 2008/0087597 A1 | 4/2008 | Johann et al. |
| 2010/0068343 A1 | 3/2010 | Johann et al. |
| 2010/0263689 A1 | 10/2010 | Monsrud et al. |
| 2014/0034579 A1 | 2/2014 | Cagnoni |
| 2015/0053618 A1 | 2/2015 | Johann et al. |
| 2015/0060366 A1 | 3/2015 | Johann et al. |
| 2015/0321188 A1 | 11/2015 | Johann et al. |

FOREIGN PATENT DOCUMENTS

| | | | |
|---|---|---|---|
| DE | 3304152 A1 | 8/1983 | |
| DE | 4410874 A1 | 10/1995 | |
| DE | 19958648 A1 | 6/2001 | |
| DE | 10020437 A1 | 11/2001 | |
| DE | 10217649 A1 | 1/2004 | |
| DE | 10231096 A1 | 1/2004 | |
| DE | 102007033337 A1 | 1/2009 | |
| DE | 102007033339 A1 | 1/2009 | |
| DE | 102010023612 A1 | 12/2010 | |
| EP | 2022760 A2 | 2/2009 | |
| EP | 2094611 B1 | 6/2010 | |
| EP | 2263503 A2 | 12/2010 | |
| GB | 684848 A * | 12/1952 | ............ B01J 39/043 |
| JP | 10109088 A * | 4/1998 | |
| JP | 2006231148 A | 9/2006 | |
| JP | 2012028159 A | 2/2012 | |
| WO | 2003085198 A2 | 10/2003 | |
| WO | 2004007374 A1 | 1/2004 | |
| WO | 2006095282 A1 | 9/2006 | |
| WO | 2011101483 A1 | 8/2011 | |
| WO | 2012107916 A1 | 8/2012 | |

OTHER PUBLICATIONS

"Parent Application in Germany No. DE 10 2012 007 149.3", "Office Action", dated Nov. 28, 2010, Publisher: DPTO, Published in: DE.

"Related International Application No. PCT/EP2013/057398", "International Search Report and Written Opinion", dated Jun. 11, 2013, Publisher: PCT/ISA, Published in: NL.

"Parallel German Patent Application No. DE 10 2012 007 149.3", "Office Action", Mar. 6, 2015, Published in: DE.

"Related International Application No. PCT/EP2013/057398 ", "International Preliminary Report on Patentability", Oct. 23, 2014, Publisher: PCT/IB WIPO, Published in: CH.

Related Application in Germany No. DE 10 2012 007 150.7, "Office Action", dated Dec. 3, 2012, Publisher: DPTO, Published in: DE.

Related International Patent Application No. PCT/EP2013/057397, "International Preliminary Report on Patentability", dated Oct. 23, 2014, Publisher: PCT/IB WIPO, Published in: CH.

Related International Application No. PCT/EP2013/057397, "International Search Report and Written Opinion", dated Jun. 11, 2013, Publisher: PCT/ISA, Published in: NL.

"Office Action" issued in related U.S. Appl. No. 14/388,640, dated Feb. 26, 2016.

"Office Action" issued in related U.S. Appl. No. 14/388,640, dated Nov. 28, 2016.

"Office Action" issued in related U.S. Appl. No. 14/388,640, dated Jun. 30, 2017.

Related Patent Application in Germany: DE 10 2012 105 723.0, "Office Action", dated Jan. 20, 2013, Publisher: DEPM, Published in: DE.

Related International Application No. PCT/EP2013/063686, "International Preliminary Report on Patentability", dated Jan. 8, 2015, Publisher: International Bureau of WIPO, Published in: CH.

Related International Application No. PCT/EP2013/063686, "International Search Report and Written Opinion", dated Aug. 19, 2013, Publisher: PCT/ IB EPO, Published in: EP.

"Office Action" issued in related U.S. Appl. No. 14/140,135, dated Mar. 1, 2017.

"Office Action" issued in related U.S. Appl. No. 14/140 135, dated Jun. 26, 2017.

"Office Action" issued in co-pending German patent application No. 102012007149.3, dated Nov. 20, 2017.

* cited by examiner

ION EXCHANGE CARTRIDGE FOR TREATING DRINKING WATER

FIELD OF THE INVENTION

The invention relates to a cartridge for treating drinking water. The cartridge is in particular designed for a gravity-operated household water filter or as a disposable cartridge for insertion into the feeding conduit of a device for preparing beverages. The invention also relates to a method for treating drinking water.

BACKGROUND OF THE INVENTION

Cartridges, especially filter cartridges for treating drinking water are known. On the one hand, these are cartridges that are used in gravity-operated water filter systems, especially for household purposes. In this case, the cartridge is arranged in a hopper into which water is filled. Through an inlet, the water flows into the cartridge at an upper side thereof and leaves the cartridge bottom at a lower outlet.

For other applications, in particular in gastronomy and for vending machines for preparing hot drinks such as coffee and tea, cartridges are known which are either inserted into a device or which have connections adapted to be connected into a drinking water conduit.

In Central Europe, such replaceable cartridges are mainly used to reduce the hardness of water, especially the carbonate hardness of drinking water. For this purpose, the cartridge is equipped with an ion-exchange material, mostly a weakly acidic resin which is disposed in a chamber in form of a granulated material. The use of such cartridges is especially intended to improve the taste of hot drinks, in particular it is possible to reduce the haziness in tea which is typical for hard water.

However, the generic cartridges for water treatment may furthermore have the task of removing suspended particles, germs, heavy metals, etc. from the water.

The cartridges are usually designed as a disposable system, i.e. they are discarded after the intended multiple use or supplied for reuse in a deposit system.

European patent EP 2094611 B1 (BWT International Trading Ltd.) discloses a method and a device for enriching water with magnesium ions. In particular, this patent discloses a cartridge for a gravity-operated household water filter, which contains a weakly acidic ion-exchange material which is partially loaded with hydrogen ions and partially with magnesium ions. This enables in a particularly simple manner to enrich the water with magnesium. At the same time, the acidification of the drinking water is reduced by the employed ion-exchange material loaded with magnesium ions.

OBJECT OF THE INVENTION

Given the above, the invention is based on the object to further improve the known cartridges for treating drinking water. In particular it is intended to improve the selectivity in terms of alkali ions or alkaline earth ions to be added, and/or to eliminate the need for a time-consuming and complex conditioning of an ion-exchange material with two ion species. Furthermore, a faster release in particular of alkaline earth ions such as magnesium is achieved in this way, because the highly acidic ion-exchanger exchanges the latter almost independently of the pH value.

SUMMARY OF THE INVENTION

The object of the invention is already achieved by a cartridge for treating drinking water and by a method for treating drinking water in accordance with the illustrative embodiment of the present invention.

The invention relates to a cartridge for treating drinking water.

In particular, the invention relates to a cartridge for a gravity-operated household water filter, i.e. a system in which the cartridge is inserted into a hopper into which the water is filled.

Such a cartridge generally includes a housing having an inlet and an outlet. Inlet and outlet are often formed as slots or as a grid structure.

The invention also relates to cartridges for use with devices for the preparation of beverages. In this case, the cartridge may be seated in the device, for example in the outlet of a water container or in the feed conduit of the device. Generally, a distinction is made between devices for preparing hot drinks such as coffee or tea, and devices for preparing cold drinks. In the latter devices, sweetener or sugar and flavorings are often added to the water.

The cartridge comprises an ion-exchange material which is in particular provided in form of granulated material. The use of a non-woven fabric as an ion-exchange material is likewise possible.

The cartridge comprises at least a first and a further chamber. A first part of the ion-exchange material, which is contained in a first chamber is loaded with alkali ions or alkaline earth ions, in particular with magnesium ions, and a second part of the ion-exchange material, which is contained in another chamber is loaded with hydrogen ions.

According to the invention, one of the two parts of the ion-exchange material is a highly acidic ion-exchange material, and the other part of the ion-exchange material is a weakly acidic ion-exchange material.

The inventor has found that when simultaneously using highly acidic and weakly acidic ion-exchange materials it is very easily possible to confection the ion-exchange material such that the properties of the filtered drinking water with respect to pH and composition can be adjusted.

Preferably, the weakly acidic ion-exchange material is predominantly loaded with other ions than the highly acidic ion-exchange material, at least in its delivery state.

The loading of the highly acidic part with alkali ions or alkaline earth ions results in an improved selectivity with respect to these ions. In addition, the highly acidic cation exchanger changes the total hardness and not only the carbonate hardness as is the case with the weakly acidic ion exchanger.

Ion exchange processes are equilibrium reactions, which causes that in particular with weakly acidic ion-exchange materials the selectivity with respect to the individual ions species varies, depending on the composition of the drinking water to be treated. The weakly acidic H-type ion exchanger exchanges only those cations which are related to carbonate hardness.

This means that the composition of the treated water also varies, for example with regard to the concentration of magnesium ions, and may be outside a desired range depending on the water used.

When using a highly acidic ion-exchange material which is at least partially loaded with alkali ions or alkaline earth ions, the desired concentration of ions to be added to the water can be well controlled.

At the same time, the part of weakly acidic ion-exchange material predominantly loaded with hydrogen ions permits to reduce the water hardness, especially the carbonate hardness, without acidifying the water to an undesirable high level.

Another advantage is based on the fact that, as contemplated according to a preferred embodiment of the invention, a portion of the ion-exchange material is predominantly loaded with one ion species, preferably to at least 90%, in particular with hydrogen ions. Thus, it is also possible for an ion-exchange material to be loaded with only one ion species.

Thus, the relatively complex conditioning of an ion-exchange material, in particular of a weakly acidic ion-exchange material, with two ion species, such as magnesium and hydrogen ions, can be dispensed with.

The weakly acidic ion-exchange material used is in particular a cationic ion-exchange material having a carboxyl group. Such synthetic resin ion exchangers are marketed under the trade names Lewatit® or Amberlite®, for example.

The highly acidic ion-exchange material is preferably a cation exchanging material including sulfonic acid groups.

If now the highly acidic portion of the ion-exchange material is predominantly loaded with hydrogen ions, it is easily possible to deliberately acidify the water, in particular to a pH of less than 3, preferably less than 2.7.

It is in particular contemplated to use such acidulated water for soft drinks, especially those soft drinks which contain sweeteners or sugar in addition to flavorings.

In one embodiment of the invention, the highly acidic ion-exchange material is loaded with alkali ions or alkaline earth ions to at least 10%, preferably at least 60%, and more preferably at least 90% of its capacity.

Preferably, the highly acidic part is predominantly loaded with alkali ions or alkaline earth ions.

In the context of the invention, the determination of the percentage of capacity to which the ion-exchange material is loaded with a specific ion species, is made according to DIN 54403 of April 2009. According to the procedure of this standard, first the total capacity of the ion-exchange material is determined. The procedure is different depending on whether a highly acidic or weakly acidic ion exchanger is concerned. Weakly acidic ion exchangers are first converted into the hydrogen form. Once the total capacity has been determined, it can then be determined to which percentage of this capacity the ion exchanger is loaded with alkali ions or alkaline earth ions or another ion species.

In an alternative embodiment of the invention, which in particular serves to acidulate the water for preparing soft drinks, the highly acidic ion-exchange material is loaded with hydrogen ions to at least 30%, preferably at least 50%, and more preferably at least 80% of its capacity which is the total capacity according to DIN 54403.

In the context of the invention, the specified capacities always refer to the delivered state. It will be understood that for example the loading with hydrogen ions will decrease during the intended use of the cartridge.

Further, it is in particular contemplated that the first and second parts of the ion-exchange material is provided in a ratio (mass ratio) from 1:9 to 9:1, preferably from 3:7 to 7:3.

Preferably, the cartridge is configured in a manner so that the water to be treated is divided into two partial streams, wherein a first partial streams passes through the highly acidic ion-exchange material, and a further partial stream passes through the weakly acidic ion-exchange material.

It has been found that by separately providing weakly acidic and highly acidic ion-exchange materials, the ratio of different ion species in the treated water can be adjusted more accurately.

In particular when an ion-exchange material is loaded with magnesium ions, it is possible to adjust a more uniform release of magnesium ions over the useful life of the cartridge.

It is in particular contemplated that the water to be treated is divided and is partly passed through a highly acidic ion exchanger and partly through a weakly acidic ion exchanger, and is then combined together again.

However, it is also conceivable that the water to be treated is first passed through the one part of the ion-exchange material and then through the other part of the ion-exchange material. Preferably, in this case, the water is first passed through an ion-exchange material which is predominantly loaded with hydrogen ions, and then through the other part of the ion-exchange material which is loaded with alkali ions or alkaline earth ions.

The invention further relates to a method for treating drinking water, in particular using a cartridge as described above.

The drinking water is divided into two partial streams, and a first partial stream is passed through a highly acidic ion-exchange material and a second partial stream through a weakly acidic ion-exchange material. One of the ion-exchange materials is at least partially, preferably predominantly loaded with alkali ions or alkaline earth ions.

In one embodiment, the highly acidic ion-exchange material is predominantly loaded with hydrogen ions, and the water is acidified to a pH of less than 3, preferably less than 2.7, so that it can be used in particular for soft drinks.

The part of the ion-exchange material loaded with alkali ions or alkaline earth ions permits to provide an additional functionality, in particular the water may be enriched with magnesium.

In an alternative embodiment of the invention, the weakly acidic part of the ion-exchange material is predominantly loaded with hydrogen ions.

The highly acidic ion-exchange material is loaded with alkali ions or alkaline earth ions, in particular with magnesium ions, whereby the water is enriched with these ions.

At the same time, the pH value of the water may be adjusted such that it does not drop to a value of less than 3.5, preferably not to a value of less than 4.2.

DETAILED DESCRIPTION

The invention will now be explained in more detail by way of schematically illustrated exemplary embodiments with reference to the drawings of FIG. 1 to FIG. 3.

Figure 1:
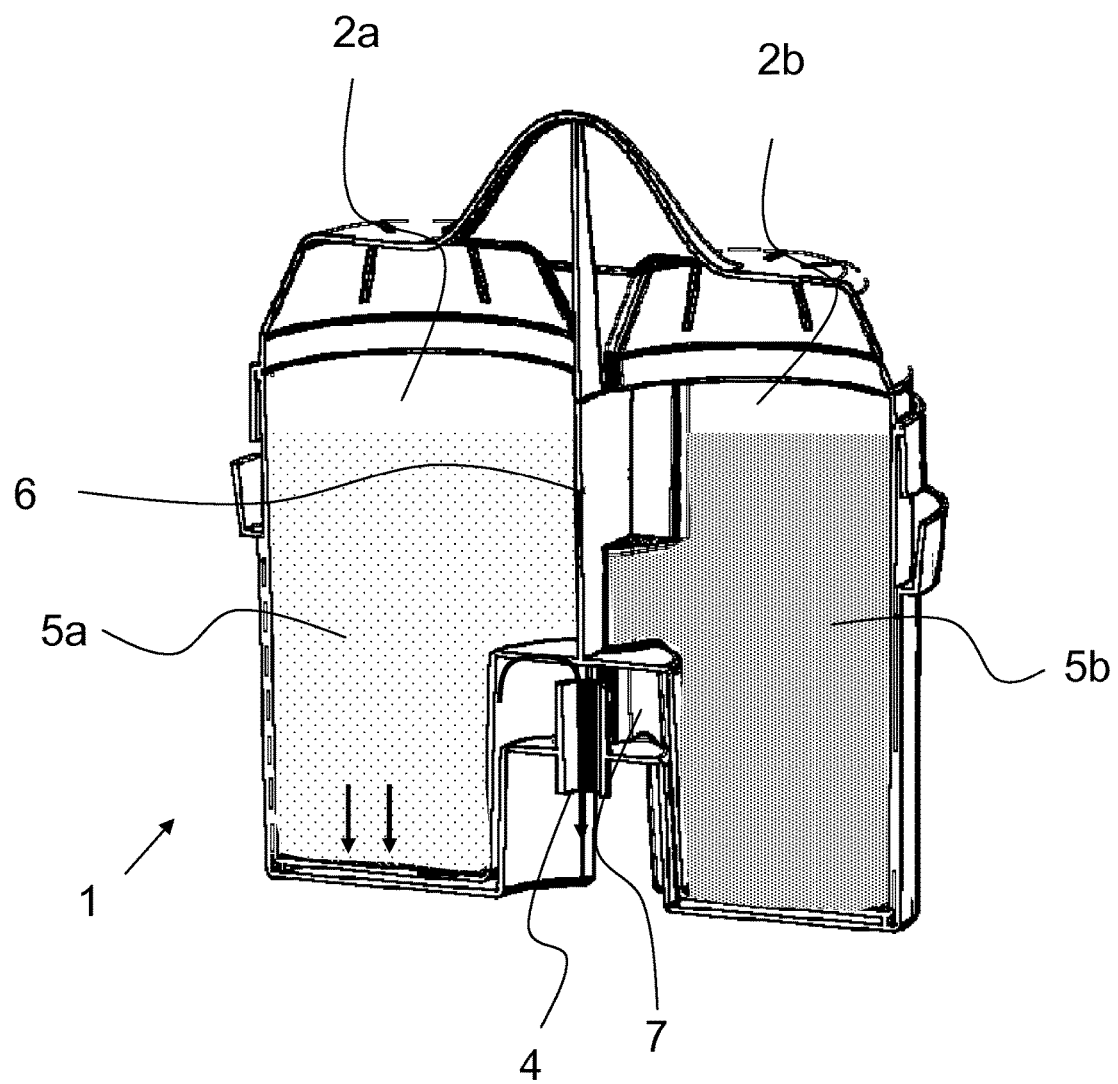
FIG. 1 is a sectional view of a cartridge for a gravity-operated household water filter.

FIG. 1 is a sectional view of a cartridge 1 for a gravity-operated household water filter such as those which may be inserted into a hopper (not shown).

The basic principle of such a cartridge is known.

In the present exemplary embodiment, cartridge 1 is a cartridge with flow reversal in which the water to be treated enters via an inlet 3 into a chamber 2 which is filled with an ion-exchange material 5.

The ion-exchange material 5 is provided in granulated form.

In this exemplary embodiment, the bottom of the cartridge has no opening, rather the water leaves the cartridge 1, after flow reversal, through a tubular outlet 4 (the path of the water is marked by arrows).

However, it will be understood that the invention is also provided for cartridges without flow reversal, which in particular have an apertured cartridge bottom that serves as an outlet (not shown).

The space in which the ion-exchange material is contained is divided into two chambers, 2a and 2b, by a wall 6.

Chamber 2a is filled with a highly acidic ion-exchange material 5a, and chamber 2b is filled with a weakly acidic ion-exchange material 5b.

One part of the water then passes through chamber 2a, while the other part passes through chamber 2b.

Following flow reversal, the water from chambers 2a and 2b combines in chamber 7 positioned above the outlet, and then leaves cartridge 1 via a tubular outlet 4.

The highly acidic ion-exchange material 5a is predominantly loaded with magnesium in its delivered state. The weakly acidic ion-exchange material 5b is predominantly loaded with hydrogen in its delivered state.

In this manner, the drinking water to be treated can be enriched with magnesium ions. Furthermore, acidification of the drinking water is reduced.

The properties of the treated water with respect to pH and magnesium content can be adjusted through the ratio of weakly acidic granulated material and highly acidic granulated material used.

When compared to the conditioning of a material with two different ion species, the manufacturing of a cartridge which in addition to reducing the hardness of water releases magnesium is simplified.

A further advantage of separating the highly acidic ion-exchange material from the weakly acidic ion-exchange material is, if the highly acidic ion-exchange material is loaded with magnesium, that the content of magnesium in the treated water can be better adjusted and may be higher.

Figure 2:
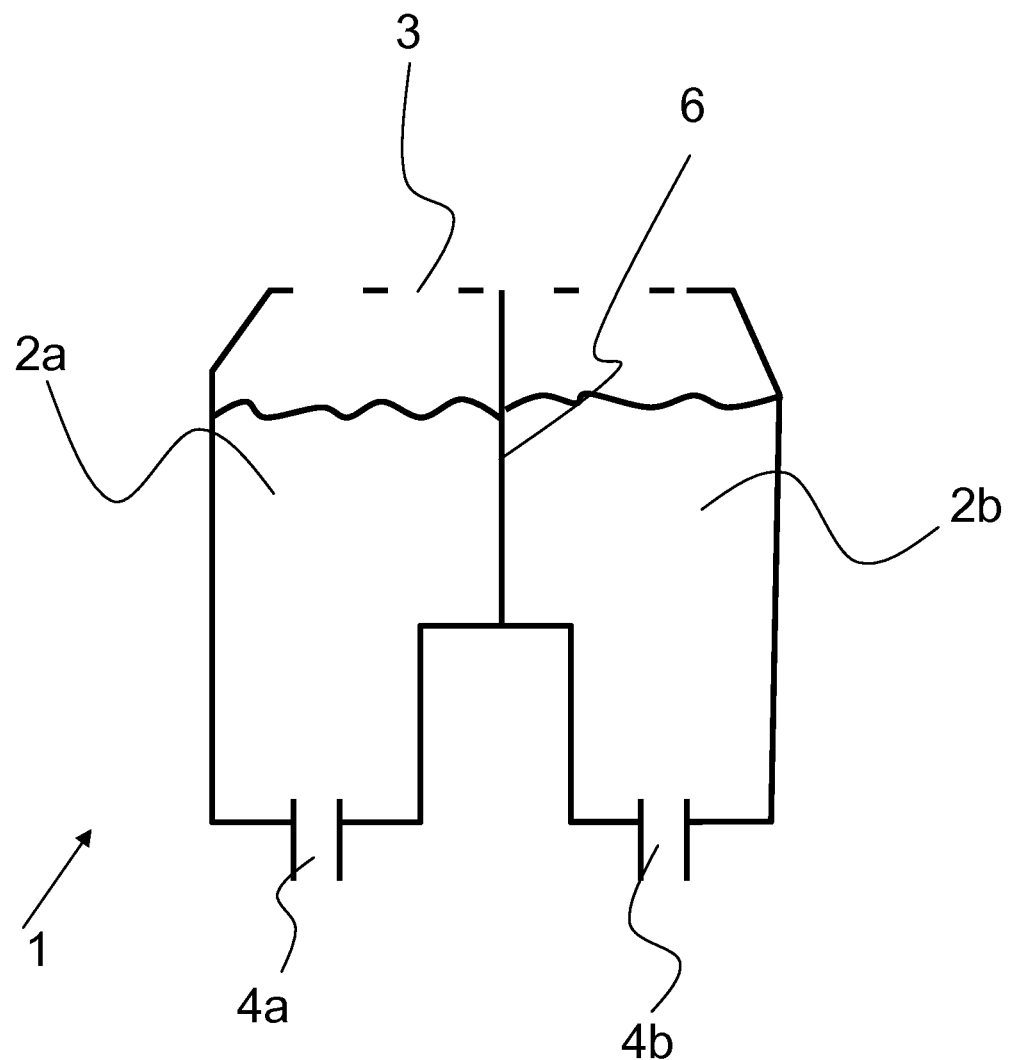
FIG. 2 is a schematic sectional view of another embodiment of cartridge for treating drinking water.

FIG. 2 is a schematic sectional view of another embodiment of a cartridge 1 for treating drinking water, in which, similar to FIG. 1, the cartridge has chambers 2a and 2b which are separated by a wall 6.

Again, one of chambers 2a, 2b is filled with a highly acidic ion-exchange material, and the other one with a weakly acidic ion-exchange material.

In contrast to the embodiment illustrated in FIG. 1, two separate outlets 4a, 4b are provided.

It is now conceivable to draw water with different properties from each of these outlets 4a, 4b.

Here, as contemplated according to one embodiment of the invention, it is again conceivable that one chamber or both chambers is/are filled with a mixture of a highly acidic and a weakly acidic ion-exchange material, in which the one part of the ion-exchange material is predominantly loaded with different ions than the other part.

It is in particular conceivable that one water outlet delivers water of a lower pH than the other outlet.

The user may now mix the water from the two outlets, or may only use the water from one outlet for specific applications, for example for preparing soft drinks, which in this case will have the lower pH.

Figure 3:
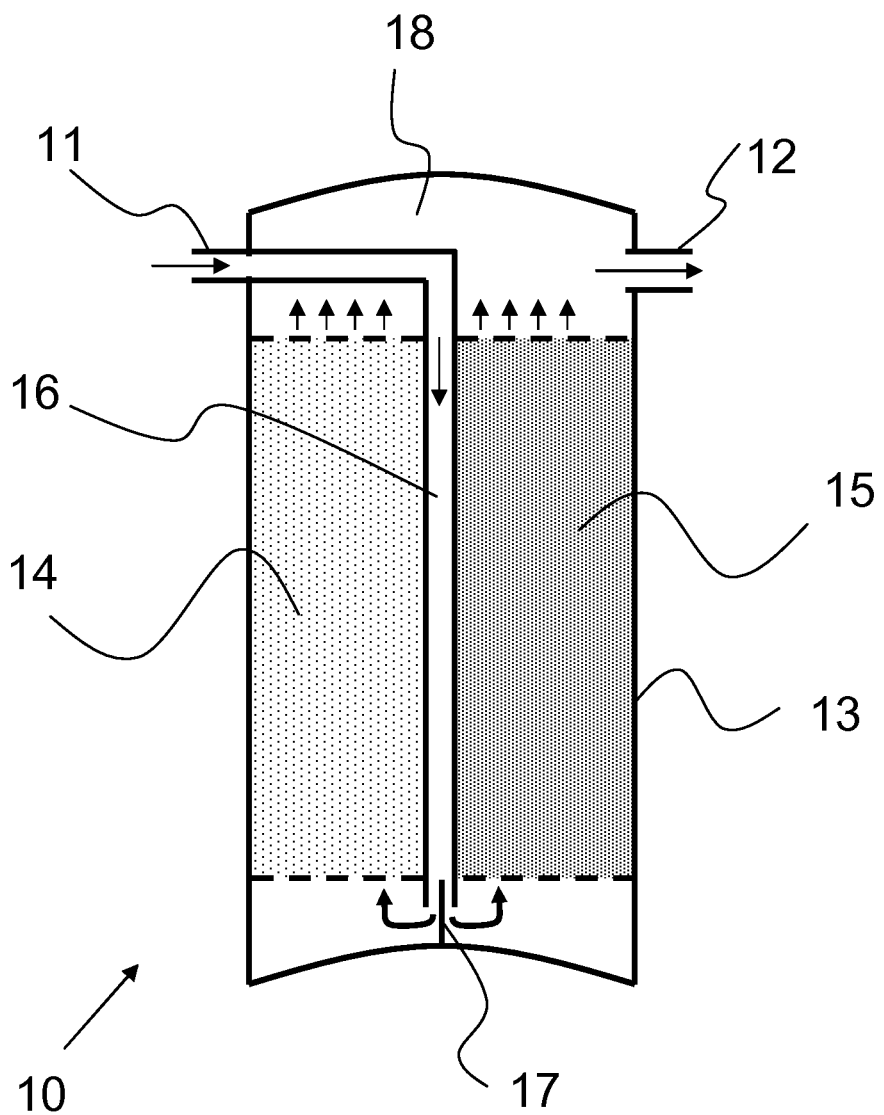
FIG. 3 shows an embodiment of a cartridge, which is adapted for being connected to a drinking water conduit.

FIG. 3 shows an embodiment of a cartridge 10, which is adapted for being connected to a drinking water conduit, in particular to the conduit of a device for preparing hot beverages, such as used in gastronomy, for example.

Cartridge 10 comprises a housing 13 with a connection 11 through which water flows into the housing 13 of cartridge 10.

The treated drinking water leaves the cartridge via connection 12 and can be supplied for further use.

The path of the water is indicated by arrows.

Inlet connection 11 is connected to a downpipe 16 through which the water to be treated is fed into the bottom of the housing 13 of cartridge 10.

The interior of cartridge 10 is separated into two parts, by a wall 17, so that in one section of the cartridge a granulate 14 of a highly acidic ion-exchange material predominantly loaded with magnesium is provided, and in a section separated therefrom a granulate 15 of a weakly acidic ion-exchange material which is predominantly converted into the hydrogen form in its delivered state.

The water rising from the cartridge bottom due to the pressure of the following inflowing water is then divided into two partial streams, one of which passes through the highly acidic granulated material 14 loaded with magnesium, and the other part passes through the weakly acidic granulated material 15 loaded with hydrogen.

In an upper chamber 18 of housing 13 of cartridge 10 there is no wall provided, so that the water of the two partial streams combines and exits cartridge 10 through outlet 12.

The invention improves selectivity with respect to alkali ions and alkaline earth ions, in particular with respect to magnesium, which results in a more uniform release.

LIST OF REFERENCE NUMERALS

1 Cartridge
2 Chamber
3 Inlet
4 Outlet
5 Ion-exchange material
6 Wall
7 Chamber
10 Cartridge
11 Connection
12 Connection
13 Housing
14 Granulated material
15 Granulated material
16 Downpipe
17 Wall
18 Chamber

What is claimed is:

1. A cartridge for treating drinking water, the cartridge comprising a first chamber containing a highly acidic ion-exchange material which is loaded with magnesium ions to at least 60% of its capacity, a second chamber containing a weakly acidic ion-exchange material which is loaded with hydrogen ions, and a wall which divides the first chamber from the second chamber, so that when drinking water enters the cartridge a first partial stream of the drinking water passes through the first chamber and a second partial stream of the drinking water passes through the second chamber, to provide treated drinking water.

2. The cartridge for treating drinking water as claimed in claim 1, wherein the ion-exchange material in the first or in the second chamber is in form of granulated material.

* * * * *